United States Patent [19]

Kinugasa et al.

[11] Patent Number: 4,762,026
[45] Date of Patent: Aug. 9, 1988

[54] SPEED CHANGE CONTROL METHOD AND DEVICE OF AUTOMATIC TRANSMISSION FOR VEHICLE

[75] Inventors: Yukio Kinugasa, Susono; Takehisa Yaegashi, Mishima, both of Japan

[73] Assignee: Toyota Jidosha Kogyo Kabushiki Kaisha, Toyota, Japan

[21] Appl. No.: 937,456

[22] Filed: Dec. 2, 1986

Related U.S. Application Data

[63] Continuation of Ser. No. 753,552, Jul. 10, 1985, abandoned, which is a continuation of Ser. No. 338,051, Jan. 8, 1982, Pat. No. 4,572,029.

[30] Foreign Application Priority Data

Aug. 26, 1981 [JP] Japan ............................ 56-132639

[51] Int. Cl.$^4$ ............................................ B60K 41/10
[52] U.S. Cl. ................................. 74/866; 74/844
[58] Field of Search ............... 74/861, 862, 866, 844

[56] References Cited

U.S. PATENT DOCUMENTS

| | | | |
|---|---|---|---|
| 2,353,840 | 7/1944 | McKechnie | 74/844 |
| 3,640,156 | 2/1972 | Mori et al. | 74/844 X |
| 3,732,754 | 5/1973 | Mori | 74/866 |
| 3,748,929 | 7/1973 | Green | 74/844 |
| 3,813,964 | 6/1974 | Ichimora et al. | 74/864 X |
| 3,895,541 | 7/1975 | Nohira et al. | 74/844 |
| 3,898,894 | 8/1975 | Aono et al. | 74/866 |
| 4,282,780 | 8/1981 | Totani et al. | 74/866 |
| 4,291,594 | 9/1981 | Baudoin | 74/866 X |
| 4,572,029 | 2/1986 | Kinugasa et al. | 74/844 X |

FOREIGN PATENT DOCUMENTS 148661  12/1978  Japan ............................ 74/844

Primary Examiner—Leslie A. Braun
Assistant Examiner—David Novais
Attorney, Agent, or Firm—Cushman, Darby & Cushman

[57] ABSTRACT

While running of an engine used to be unstable in warming-up, the output of the engine is large and the running of the engine is maintained stably in high vehicle speed even if the engine is in the warming-up. According to the present invention, an automatic transmission is allowed to be run in the high speed stage in the high vehicle speed even during the warming-up.

6 Claims, 6 Drawing Sheets

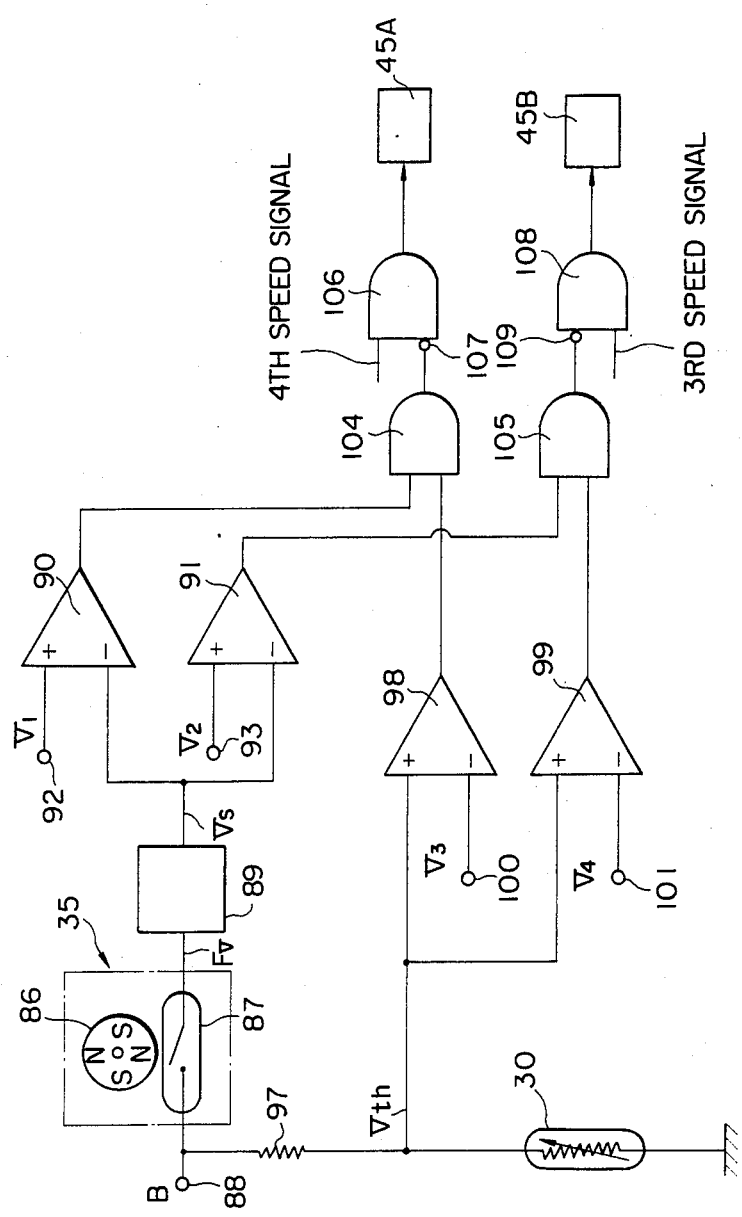
F I G. 5

SPEED CHANGE CONTROL METHOD AND DEVICE OF AUTOMATIC TRANSMISSION FOR VEHICLE

This is a continuation of application Ser. No. 753,552, filed July 10, 1985, which was abandoned upon the filing hereof, which in turn was a continuation of Ser. No. 338,051 filed Jan. 8, 1982, now U.S. Pat. No. 4,572,029 issued Feb. 25, 1986.

BACKGROUND OF THE INVENTION

1. Field of the Invention

This invention relates to a speed change control method and device of an automatic transmission for a vehicle provided with an electronic control for controlling oil pressure supply to a hydraulic servo for a friction engaging device according to electric signals.

2. Description of the Prior Art

In a prior automatic transmission to maintain the drivability, at a low engine temperature, a speed change to a predetermined high speed stage (speed change stage producing reduction gear ratio lower than a predetermined value) is prohibited at the low temperature of the engine irrespective of vehicle speed. However, when the vehicle proceeds rapidly to high speed travelling after starting the engine, the output of the engine is sufficiently large so that no obstacles against the drivability are encountered in the travelling at the high speed stage. Namely, in the prior automatic transmission, the vehicle is driven at the low speed stage even though in such a case disadvantages are produced such as inefficiency of fuel comsumption and restraint in noxious exhaust gas component production.

SUMMARY OF THE INVENTION

An object of the present invention is to provide a speed change control method and device of an automatic transmission for a vehicle, which improves the efficiency of fuel consumption and purges noxious exhaust gas components at low engine temperatures during high speed travelling.

According to the speed change control method of the automatic transmission for the vehicle, according to the present invention to achieve this object, when the engine temperature is lower than a predetermined value and the vehicle speed is higher than a predetermined value, a speed change stage is allowed to produce a reduction gear ratio lower than the predetermined value and when the vehicle speed is lower than the predetermined value said speed change stage is prohibited from being operated.

Also, the speed change control device of the automatic transmission for the vehicle according to the present invention is provided with a first voltage producing means for producing voltage related to the engine temperature, a second voltage producing means for producing voltage related to vehicle speed, a first comparator for comparing the output voltage of the first voltage producing means with a first predetermined value, a second comparator for comparing the output voltage of the second voltage producing means with a second predetermined value, an oil pressure supply controlling means for controlling oil pressure supply to a hydraulic servo for a friction engaging device upon receiving operating signals when a speed change stage producing reduction gear ratio lower than a predetermined value is carried out and a blocking means for blocking the input of the operating signal to the oil pressure supply controlling means only when the engine temperature is lower than a predetermined value and the vehicle speed is lower than a predetermined value in response to the outputs of the first and second comparators.

As a result, even if the engine is still in low temperature without being sufficiently warmed up, the automatic transmission can be changed over to the high speed stage in the high speed travelling with sufficiently large output of the engine. Thus, running time at the high speed stage is increased, efficiency of fuel consumption improved and purge amount of noxious components restrained without impairing the drivability in the warming-up.

In preferred embodiments of the present invention, the engine temperature is detected from temperature of cooling water, lubricating oil or cylinder head corresponding to the engine temperature. Also, preferably the automatic transmission is of an advance four speed type and the fourth speed provides over-drive. The speed change stage prohibited when the engine temperature is lower than a predetermined value and the vehicle speed is lower than a predetermined value provides preferably the fourth speed or the third speed and the fourth speed. Further in the embodiments of the present invention, a requirement for prohibiting the third speed is made different from that for prohibiting the fourth speed, and set values of the cooling water temperature and vehicle speed for prohibiting the fourth speed are made larger than those for prohibiting the third speed.

BRIEF DESCRIPTION OF THE DRAWINGS

FIG. 5 is a schematic drawing of an embodiment of the device according to the present invention;

DETAILED DESCRIPTION OF THE PREFERRED EMBODIMENTS

Hereinafter will be described the embodiments of the present invention with reference to the drawings.

Figure 1:
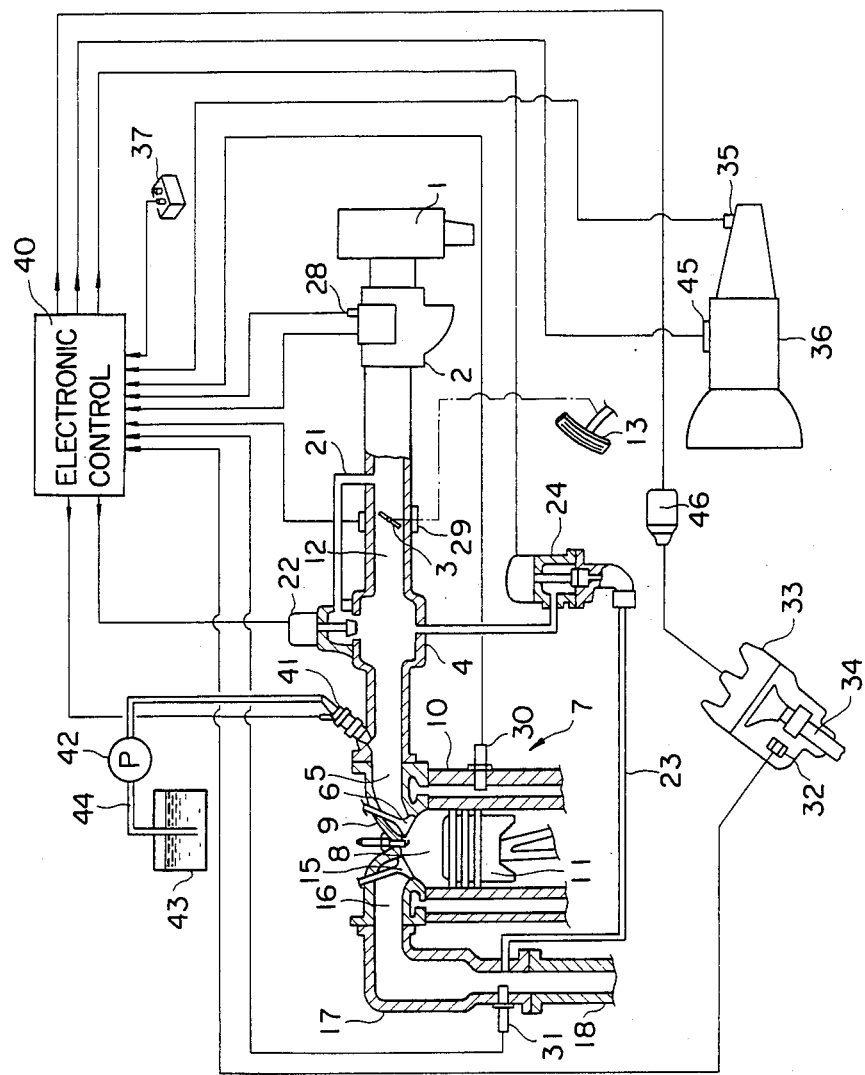
FIG. 1 is a schematic illustration of the whole electronic control engine according to the present invention.

FIG. 1 is a schematic illustration of an electronic control fuel injection engine according to the present invention. Air sucked through an air cleaner 1 is sent to a combustion chamber 8 of an engine body 7 through an intake path 12 including an air flow meter 2, throttle valve 3, surge tank 4, intake port 5 and intake valve 6. The throttle valve 3 is interlocked with an accelerator pedal 13 in a cab. The combustion chamber 8 is defined by a cylinder head 9, cylinder block 10 and piston 11, and exhaust gas produced by the combustion of fuel mixture is purged to the atmospheric air through an exhaust valve 15, exhaust port 16, exhaust manifold 17 and exhaust pipe 18. The upstream side of the throttle valve 3 is connected to the surge tank 4 through a bypass path 21, and a bypass flow controlling valve 22 controls the sectional area of the flow in the bypass path 21 to maintain constant rotational speed of the engine in idling. An exhaust gas recirculation (EGR) path 23 for conducting exhaust gas to an intake system to restrain the production of nitric oxide connects the exhaust manifold 17 to the surge tank 4, and an exhaust gas recirculation (EGR) controlling valve 24 of a on-off valve type opens and closes the EGR path 23 in response to electric pulses. An intake temperature sensor 28 provided in the air flow meter 2 detects intake temperature and a throttle position sensor 29 detects the opening of the throttle valve 3. A water temperature sensor 30 mounted on the cylinder block 10 detects cooling water temperature, i.e. engine temperature, and air fuel ratio sensor 31 well known for an oxygen concentration sensor is mounted on the aggregate portion of the exhaust manifold 17 to detect the oxygen concentration in the aggregate portion. A crank angle sensor 32 detects the crank angle of crank shaft from the rotation of a shaft 34 of a distributor 33 coupled to a crank shaft (not shown) of the engine body 7. A vehicle speed sensor 35 detects the rotational speed of the output shaft of the automatic transmission 36. The outputs of these sensors 2, 28, 29, 30, 31, 32, 35 and voltage of an accumulator 37 are sent to an electronic control 40. Fuel injection valves 41 are respectively provided near the respective intake ports 5 corresponding to the respective cylinders, and a pump 42 sends fuel from a fuel tank 43 through a fuel path 44 to the fuel injection valve 41. The electronic control 40 calculates the fuel injection amount by the use of the input signals from the respective sensors as parameters to send electric pulses with pulse width corresponding to the calculated fuel injection amount to the fuel injection valve 41. Also, the electronic control 40 controls the bypass flow controlling valve 22, EGR controlling valve 24, solenoid 45 in a hydraulic control circuit of the automatic transmission and an ignition unit 46. The secondary side of an ignition coil in the ignition unit 46 is connected to the distributor 33.

Figure 2:
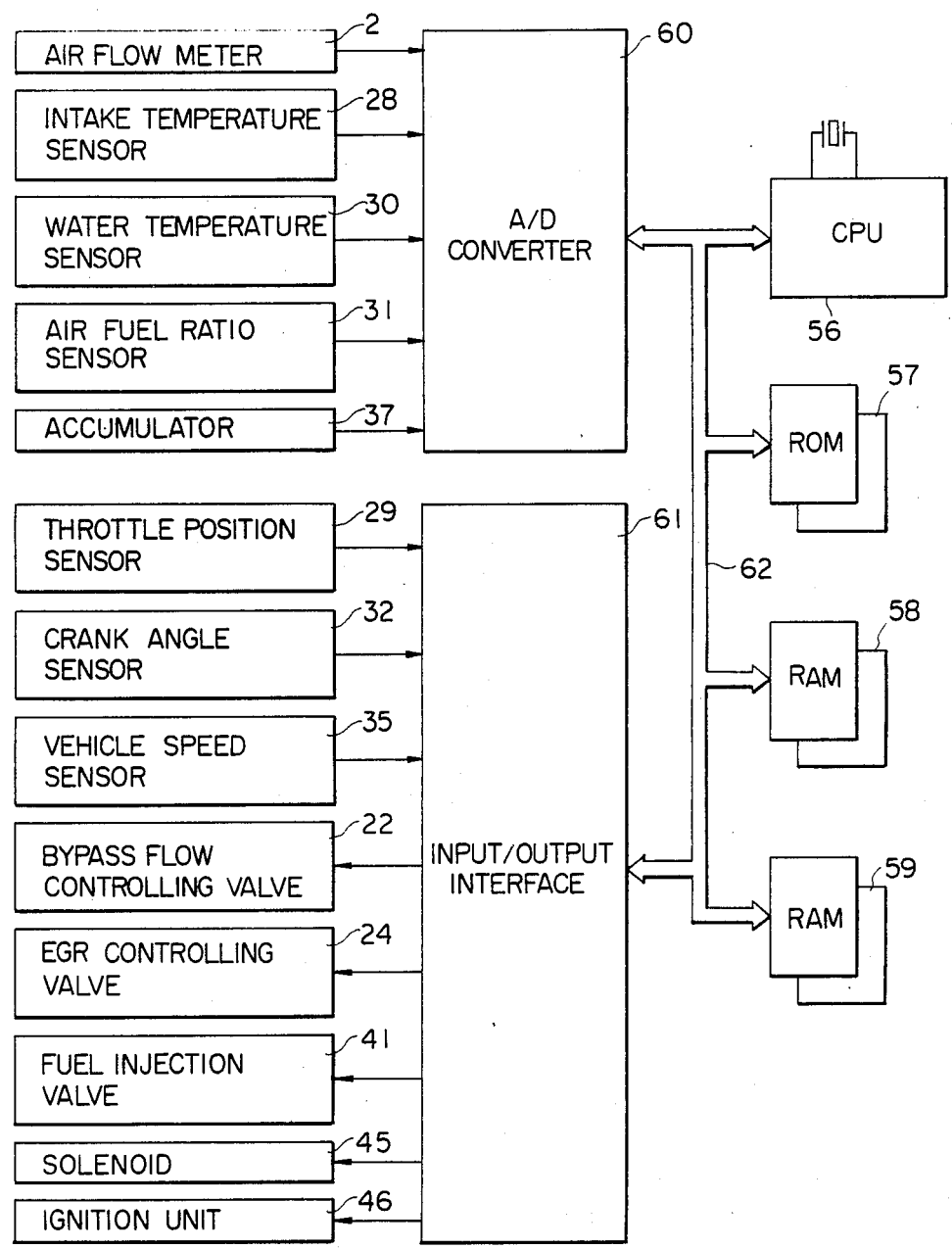
FIG. 2 is a block diagram of an electronic control shown in FIG. 1.

FIG. 2 is a block diagram of the interior of the electronic control. CPU (Central Processing Unit) 56, ROM (Read-Only Memory) 57, RAM (Random Access Memory) 58, 59, A/D (Analog/Digital) Converter 60 with multiplexer and input/output interface 61 are connected to each other through a bus 62. RAM 59 is connected to an auxiliary power source so that a predetermined electric power is supplied to maintain memory while an ignition switch is opened and the engine is stopped. Analog signals from the air flow meter 2, intake temperature sensor 28, water temperature sensor 30 and air fuel ratio sensor 31 are sent to the A/D converter. The outputs of the throttle position sensor 29, crank angle sensor 32 and vehicle speed sensor 35 are sent to the input/output interface 61 which sends the input signals to the bypass flow controlling valve 22, EGR controlling valve 24, solenoid 45 and ignition unit 46.

Figure 3A:
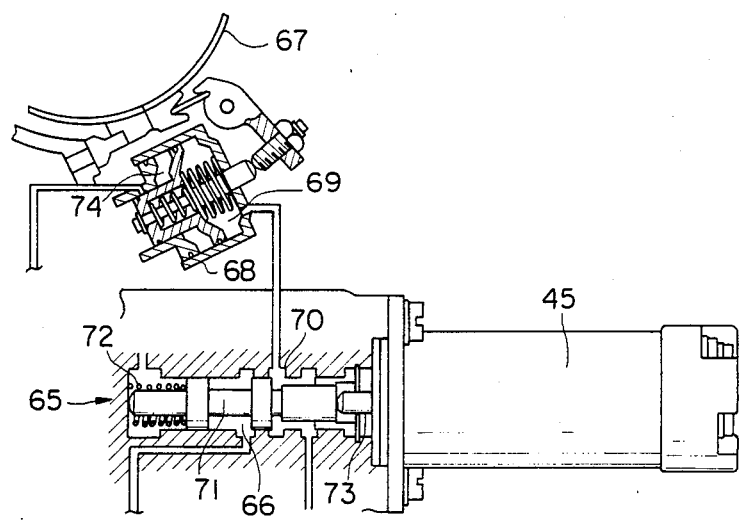
FIGS. 3(a) and 3(b) are drawings exemplifying a hydraulic control circuit having hydraulic connection changed over by a solenoid.
Figure 3B:
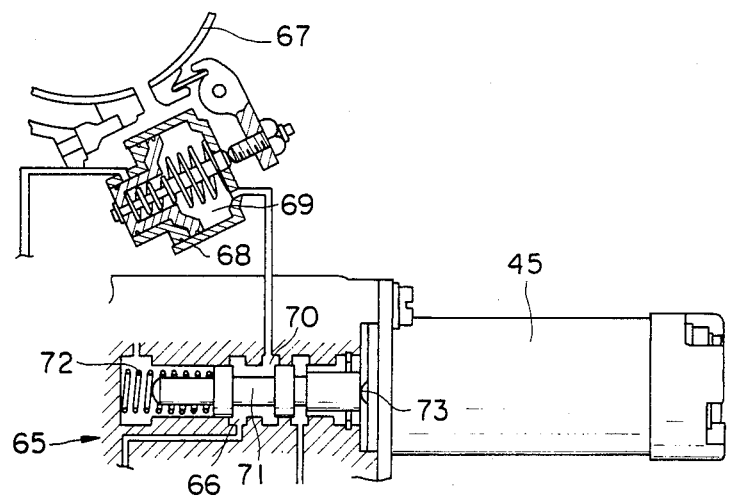

FIG. 3 shows the solenoid 45 in the hydraulic control circuit. A speed change valve 65 is provided with an input port 66 having line pressure sent from a manual valve (not shown) operated by a speed change lever in the cab, an output port 70 connected to an oil chamber 69 in the hydraulic servo 68 for a brake band 67 as the friction engaging device of the automatic transmission 36, a spool 71 for controlling the connection between the ports 66, 70 and a spring 72 for urging the spool 71 towards solenoid 45. A rod 73 protrudes to displace the spool 71 against the spring 72 when the solenoid 45 is energized (FIG. 3(a)) and the input port 66 is disconnected from the output port 70. Thus, the line pressure is not supplied to the oil chamber 69 in the hydraulic servo 68 so that the brake band 67 is in the engaging condition due to the line pressure in the other oil chamber 74 of the hydraulic servo 68. Also, when the solenoid 45 is deenergized (FIG. 3(b)), the rod 73 is pulled in by the solenoid 45, the spool 71 is moved towards the solenoid 45 by the spring 72 to connect the input port 66 to the output port 70. Thus, the line pressure is supplied to the oil chamber 69 in the hydraulic servo 68 to release the brake band 67.

Figure 4:
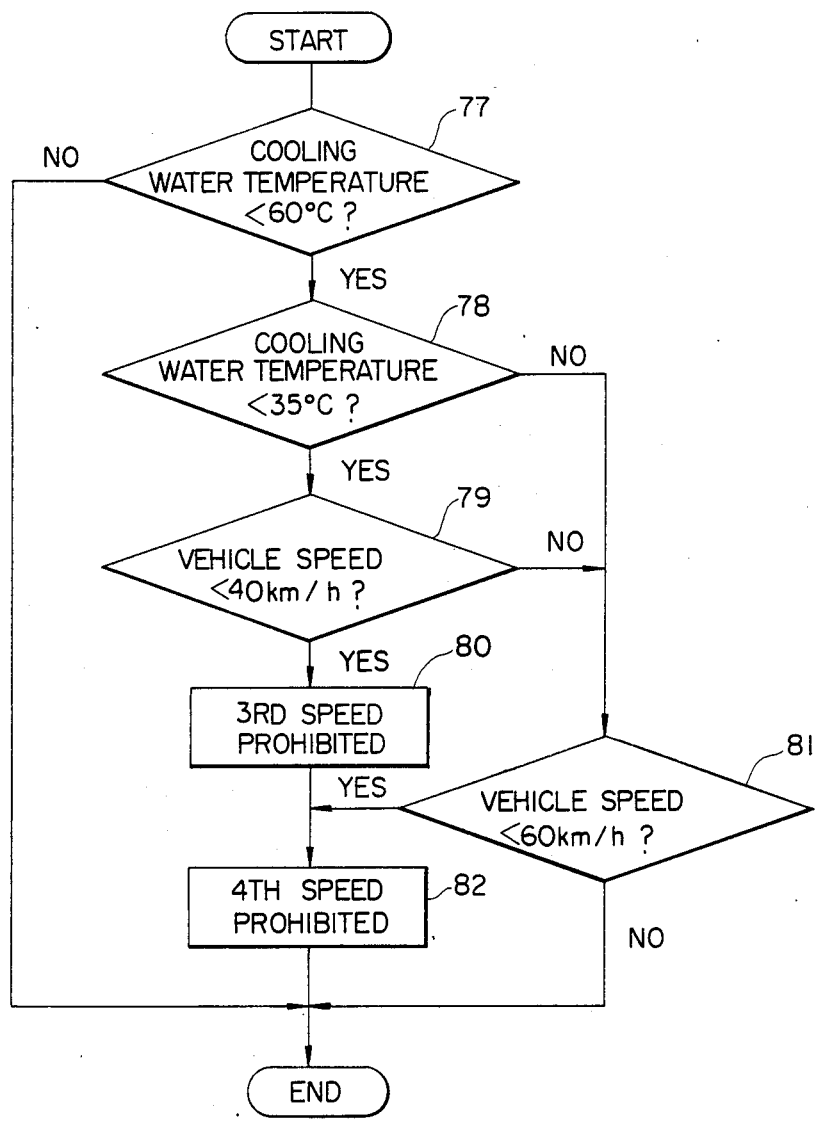
FIG. 4 is a flow chart of an example of a program according to a method of the present invention.

FIG. 4 is a flow chart of an example of program according to the present invention. The embodiment of the automatic transmission 36 is assumed to be of an advance four speed type and the fourth speed assumed to provide over drive. In step 77 is judged by the input signals from the water temperature sensor 30 whether or not the cooling water temperature corresponding to the engine temperature is lower than 60° C. and the program proceeds to step 78 if it is judged yes and terminates if no. Namely, if the cooling water temperature is higher than 60° C., the vehicle is run with the first to fourth speeds on relation to the vehicle speed and engine load. In step 78 is judged whether or not the cooling water temperature is lower than 35° C. and the program proceeds to step 79 if it is judged yes and to step 81 if no. In step 79 is judged by the input signal from the vehicle speed sensor 35 whether or not the vehicle speed is lower than 40 km/h and the program proceeds to step 80 if it is judged yes and to step 81 if no. In step 80 is prohibited the third speed. Namely, when the cooling water temperature is lower than 35° C. and the vehicle speed is lower than 40 km/h, the third speed is prohibited, and when the cooling water temperature is higher than 35° C. or the vehicle speed is higher than 40 km/h though the vehicle is run only by the first and second speeds, up-shift to the third speed is performed in a predetermined running range in the same manner as in the completion of warming-up. In step 81 is judged whether or not the vehicle speed is lower than 60 km/h and the program proceeds to step 82 if it is judged yes and terminates if no. In step 82 is prohibited the fourth speed. Namely, when the cooling water temperature is lower than 60° C. and the vehicle speed is lower than 60 km/h, the fourth speed is prohibited. However, when the cooling water temperature is higher than 60° C. or the vehicle speed is higher than 60 km/h, the up-shift to the fourth speed is performed in a predetermined running range in the same manner as in the completion of warming-up.

Figure 6:
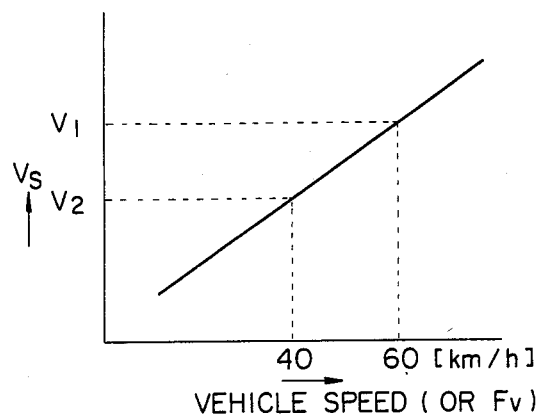
FIG. 6 is a graph showing the input-output characteristics of a F/V converter shown in FIG. 5.
Figure 7:
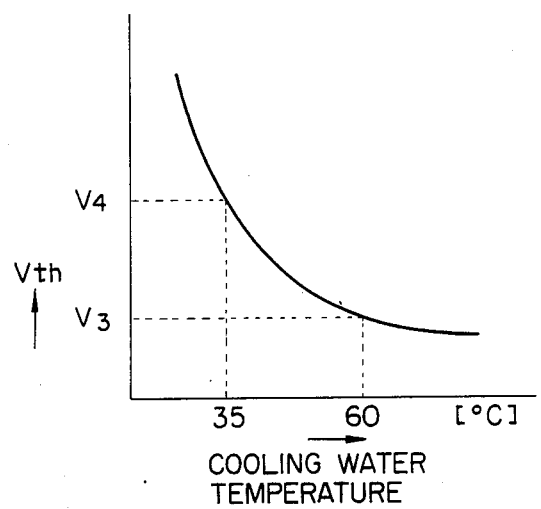
FIG. 7 is a graph showing the relationship between cooling water temperature and the output voltage of a water temperature sensor shown in FIG. 5.

FIG. 5 is a schematic diagram of an embodiment of the device according to the present invention. The vehicle speed sensor 35 is constituted from a magnetized disk 86 rotating integrally with a cable connected to the output shaft of the automatic transmission 36 and a reed switch 87 opened and closed along with the rotation of this magnetized disk 86. The reed switch 87 is connected on one end with a voltage terminal 88 at a predetermined voltage B and on the other end with the input terminal of F/V (Frequency/Voltage) converter 89. The output voltage Vs of F/V converter 89 is sent to inversion terminals of comparators 90, 91, and to noninversion terminals of the comparators 90, 91 are connected respectively terminals 92, 93 at predetermined voltages V1, V2. The predetermined voltages V1, V2 correspond respectively to the vehicle speeds 60 km/h, 40 km/h for example. FIG. 6 shows the relationship between input frequency Fv, i.e. vehicle speed and the output voltage Vs in F/V converter 89. Vs is a linear function of FV. The water temperature sensor 30 comprises a thermistor, having voltage B of terminal 88 applied through a resistance 97. The output voltage Vth of the water temperature sensor 30 is connected to the non-inversion terminals of comparators 98, 99, and to the inversion terminals of the comparators 98, 99 are respectively connected terminals 100, 101 at predetermined voltages V3, V4. The predetermined voltages V3, V4 correspond respectively to the cooling water temperatures 60° C., 35° C. for example. FIG. 7 shows the relationship between the cooling water temperature and the output voltage Vth of the water temperature sensor 30. Vth is inversely proportional to the cooling water temperature. These comparators 90, 91, 98 and 99 produce "1" (hereinafter high level voltage is defined as "1" and low level voltage as "0" respectively) only when the input voltages Vs, Vth at the inversion terminals are lower than the input voltages V1, V2, V3, V4 at the noninversion terminals. The output of the comparators 90, 98 are sent to AND circuit 104 and the outputs of comparators 91, 99 is sent to AND circuit 105. AND circuit 106 receives the fourth speed signal at one input terminal and the output of AND circuit 104 at the other input terminal through an inverter 107. AND circuit 108 receives the third speed signal at one input terminal and the output of the AND circuit 105 at the other input terminal through an inverter 109. The outputs of the AND circuit 106, 108 are sent respectively to a solenoid 45A for the fourth speed and a solenoid 45B for the third speed in the hydraulic control circuit.

Since the outputs of the comparators 90, 98 are both "1" when the vehicle speed is lower than 60 km/h and the cooling water temperature is lower than 60° C., the output of the AND circuit 104 is "1" and thus one input of the AND circuit 106 sent through the inverter 107 is "0". Thus, the fourth speed signal is not sent to the solenoid 45A for the fourth signal and the performance of the fourth speed is prohibited. However, the output of the AND circuit 104 is "0" and the input of the AND circuit 106 at the inverter 107 side is "1" when the vehicle speed is at least 60 km/h though the cooling water temperature is lower than 60° C., so that the fourth speed signal can pass through the AND circuit 106 to permit the performance of the fourth speed.

Since the outputs of the comparators 91, 99 are both "1" when the vehicle speed is lower than 40 km/h and the cooling water temperature is lower than 35° C., the output of the AND circuit 105 is "1" and thus input of the AND circuit 108 at the inverter 109 side is "0". Thus, the passage of the third speed signal through the AND circuit 108 is blocked and the performance of the third speed is prohibited. However, since the input of the AND circuit 108 at the inverter 109 side is 0 when the vehicle speed is at least 40 km/h though the cooling water temperature is lower than 35° C., the third speed signal can pass through the AND circuit 108 to permit the performance of the third speed.

Thus, according to the present invention, when the vehicle is run with high vehicle speed though the engine is still in the warming-up and low temperature range, the engine can be run on a speed change stage having small reduction gear ratio, i.e. on high speed stage without damaging the drivability of the engine. Consequently, efficiency of fuel consumption in the high speed travelling at the low engine temperature can be improved and the amount of noxious components purged can be restrained.

What is claimed is:

1. A speed change method of an automatic transmission for a vehicle, the method comprising the following steps:
    defining shift points in relation to vehicle speed and independently of engine temperature;
    carrying out a speed change on the basis of said shift points;
    inhibiting the transmission from being in a higher speed condition under all vehicle operating conditions when engine temperature is lower than a predetermined temperature and vehicle speed is lower than a predetermined speed; and
    allowing the transmission to be in a higher speed condition when engine temperature is lower than said predetermined temperature and vehicle speed is higher than said predetermined speed, or when engine temperature is higher than said predetermined temperature.

2. A speed change method as defined in claim 1, wherein the temperature of the engine is detected from temperature of cooling water.

3. A speed change method as defined in claim 1, wherein the automatic transmission is of a four forward speed type and when the engine temperature is lower than a first temperature value and the vehicle speed is lower than a first vehicle speed value a fourth speed is prohibited from being performed.

4. A speed change method as defined in claim 3, wherein when the engine temperature is lower than a second temperature value which is lower than the first temperature value and the vehicle speed is lower than a second vehicle speed value which is lower than the first vehicle speed value a third speed is prohibited from being performed.

5. A speed change method as defined in claim 1, wherein the temperature of the engine is detected from temperature of lubricating oil.

6. A speed change method as defined in claim 1, wherein the temperature of the engine is detected from temperature of cylinder head.

* * * * *